(12) United States Patent
Patton et al.

(10) Patent No.: US 9,756,707 B2
(45) Date of Patent: Sep. 5, 2017

(54) ELECTRIC LIGHTING DEVICES HAVING MULTIPLE LIGHT SOURCES TO SIMULATE A FLAME

(71) Applicant: Luminara Worldwide, LLC, Eden Prairie, MN (US)

(72) Inventors: Douglas Patton, Irvine, CA (US); Eric Ford, Eden Prairie, MN (US)

(73) Assignee: Luminara Worldwide LLC, Eden Prairie, MN (US)

( * ) Notice: Subject to any disclaimer, the term of this patent is extended or adjusted under 35 U.S.C. 154(b) by 0 days.

(21) Appl. No.: 14/760,418

(22) PCT Filed: Jan. 30, 2014

(86) PCT No.: PCT/US2014/013867
§ 371 (c)(1),
(2) Date: Jul. 10, 2015

(87) PCT Pub. No.: WO2014/120933
PCT Pub. Date: Aug. 7, 2014

(65) Prior Publication Data
US 2015/0354769 A1    Dec. 10, 2015

Related U.S. Application Data

(60) Provisional application No. 61/758,602, filed on Jan. 30, 2013.

(51) Int. Cl.
*H05B 37/02* (2006.01)
*F21V 33/00* (2006.01)
(Continued)

(52) U.S. Cl.
CPC ........ *H05B 37/0272* (2013.01); *F21S 10/043* (2013.01); *F21S 10/046* (2013.01); *F21V 5/007* (2013.01); *F21V 11/18* (2013.01); *F21V 17/02* (2013.01); *F21V 17/10* (2013.01); *F21V 23/003* (2013.01); *F21V 23/0442* (2013.01); *F21V 31/00* (2013.01); *F21V 33/0028* (2013.01);
(Continued)

(58) Field of Classification Search
CPC ........ F21S 10/043; F21S 10/046; F21S 10/00; F21S 10/04; F21V 5/007
USPC .................................. 362/569, 161
See application file for complete search history.

(56) References Cited

U.S. PATENT DOCUMENTS

| 5,924,784 A | 7/1999 | Chliwnyj et al. |
| 6,213,627 B1 * | 4/2001 | Abersfelder ............. G02B 5/32 |
| | | 359/599 |

(Continued)

FOREIGN PATENT DOCUMENTS

| CA | 2647987 A | 10/2007 |
| CN | 2888274 Y | 4/2007 |

(Continued)

*Primary Examiner* — Jong-Suk (James) Lee
*Assistant Examiner* — Christopher E Dunay
(74) *Attorney, Agent, or Firm* — Umberg Zipser LLP

(57) ABSTRACT

Electric lighting devices are described that utilize three or more light sources to generate a flickering flame effect. The light sources can emit light at different colors to more closely simulate the look of a flame. A projection system having a matrix of LEDs could be used to project an image of a flame on to a projection surface without the need or cost associated with a traditional or pico projector.

12 Claims, 11 Drawing Sheets

(51) Int. Cl.
*F21V 11/18* (2006.01)
*F21V 23/04* (2006.01)
*F21V 5/00* (2015.01)
*F21V 23/00* (2015.01)
*H04N 9/31* (2006.01)
*F21S 10/04* (2006.01)
*F21V 17/02* (2006.01)
*F21V 17/10* (2006.01)
*F21V 31/00* (2006.01)
*F21Y 113/00* (2016.01)
*F21W 121/00* (2006.01)
*F21Y 113/10* (2016.01)

(52) U.S. Cl.
CPC .......... *F21V 33/0052* (2013.01); *H04N 9/31* (2013.01); *F21V 23/0464* (2013.01); *F21V 23/0471* (2013.01); *F21W 2121/00* (2013.01); *F21Y 2113/00* (2013.01); *F21Y 2113/10* (2016.08)

(56) References Cited

U.S. PATENT DOCUMENTS

| | | |
|---|---|---|
| 6,719,443 B2 | 4/2004 | Gutstein et al. |
| 7,029,146 B2 | 4/2006 | Kitchen |
| 7,118,243 B2 | 10/2006 | McCavit et al. |
| 7,159,994 B2 | 1/2007 | Schnuckle et al. |
| 7,261,455 B2 | 8/2007 | Schnuckle et al. |
| 7,350,720 B2 | 4/2008 | Jaworski et al. |
| 7,360,935 B2 | 4/2008 | Jensen et al. |
| 7,481,571 B2 | 1/2009 | Bistritzky et al. |
| 7,503,668 B2 | 3/2009 | Porchia et al. |
| 7,686,471 B2 | 3/2010 | Reichow |
| 7,824,627 B2 | 11/2010 | Michaels et al. |
| 7,828,462 B2 | 11/2010 | Jensen et al. |
| 7,837,355 B2 | 11/2010 | Schnuckle et al. |
| 8,070,319 B2 | 12/2011 | Schnuckle et al. |
| 8,132,936 B2 | 3/2012 | Patton et al. |
| 8,235,558 B1 | 8/2012 | Lauer |
| 8,256,935 B1 | 9/2012 | Cullimore et al. |
| 8,342,712 B2 | 1/2013 | Patton et al. |
| 8,733,986 B2 | 5/2014 | Hau et al. |
| 2001/0033488 A1 | 10/2001 | Chliwnyj et al. |
| 2002/0093834 A1 | 7/2002 | Yu et al. |
| 2003/0053305 A1 | 3/2003 | Lin |
| 2003/0081420 A1 | 5/2003 | Jensen et al. |
| 2004/0165374 A1 | 8/2004 | Robinson |
| 2004/0223326 A1* | 11/2004 | Wainwright ............ F21S 6/001 362/231 |
| 2004/0252498 A1 | 12/2004 | Gutstein et al. |
| 2005/0169666 A1 | 8/2005 | Porchia et al. |
| 2005/0196716 A1* | 9/2005 | Haab ...................... F21S 6/001 431/126 |
| 2005/0285538 A1 | 12/2005 | Jaworski et al. |
| 2006/0034100 A1* | 2/2006 | Schnuckle ................ B44C 5/06 362/161 |
| 2006/0039835 A1 | 2/2006 | Nottingham et al. |
| 2006/0125420 A1 | 6/2006 | Boone et al. |
| 2006/0146544 A1 | 7/2006 | Leung |
| 2006/0232958 A1 | 10/2006 | Chang |
| 2007/0002560 A1 | 1/2007 | Gutstein et al. |
| 2007/0127249 A1 | 6/2007 | Medley et al. |
| 2007/0177394 A1 | 8/2007 | Vock et al. |
| 2007/0236947 A1 | 10/2007 | Jensen et al. |
| 2008/0031784 A1* | 2/2008 | Bistritzky ............ A01M 1/2033 422/124 |
| 2008/0038156 A1 | 2/2008 | Jaramillo |
| 2008/0074875 A1 | 3/2008 | Jensen et al. |
| 2008/0117633 A1 | 5/2008 | Li |
| 2008/0130266 A1 | 6/2008 | DeWitt et al. |
| 2008/0150453 A1 | 6/2008 | Medley et al. |
| 2010/0134022 A1 | 6/2010 | Gutstein et al. |
| 2010/0231862 A1* | 9/2010 | Itoh ..................... G02B 27/0994 353/31 |
| 2011/0027124 A1 | 2/2011 | Albee et al. |
| 2011/0074297 A1 | 3/2011 | Gutstein et al. |
| 2011/0127914 A1* | 6/2011 | Patton ...................... F21S 10/04 315/76 |
| 2011/0134628 A1 | 6/2011 | Pestl et al. |
| 2011/0279034 A1* | 11/2011 | Lucas .................. F21V 23/0464 315/92 |
| 2012/0020052 A1 | 1/2012 | McCavit et al. |
| 2012/0024837 A1 | 2/2012 | Thompson |
| 2012/0093491 A1 | 4/2012 | Browder et al. |
| 2012/0134157 A1* | 5/2012 | Li .......................... F21S 6/001 362/277 |
| 2012/0201020 A1 | 8/2012 | Gutstein et al. |
| 2012/0300459 A1 | 11/2012 | Hau et al. |
| 2014/0098532 A1 | 4/2014 | Chiang |
| 2014/0140534 A1 | 5/2014 | Gutstein et al. |
| 2014/0254148 A1* | 9/2014 | Fournier .................. F21L 4/00 362/235 |
| 2015/0124442 A1* | 5/2015 | Ding ...................... F21S 6/001 362/231 |
| 2015/0163885 A1 | 6/2015 | Gutstein et al. |
| 2015/0204530 A1* | 7/2015 | Lee ...................... F21V 23/0457 362/282 |
| 2015/0308643 A1* | 10/2015 | Huang .................. F21S 10/046 362/157 |
| 2015/0362141 A1* | 12/2015 | Chen .................... F21S 10/046 362/183 |

FOREIGN PATENT DOCUMENTS

| | | |
|---|---|---|
| CN | 200940808 Y | 8/2007 |
| CN | 201011621 Y | 1/2008 |
| EP | 1878449 A1 | 1/2008 |
| EP | 1869360 B1 | 11/2011 |
| GB | 2323159 A | 9/1998 |
| GB | 2379731 A | 3/2003 |
| KR | 10-2010-0128775 A | 12/2010 |
| WO | 2006/020839 A2 | 2/2006 |
| WO | 2006/104898 A1 | 10/2006 |
| WO | 2007/120540 A1 | 10/2007 |

* cited by examiner

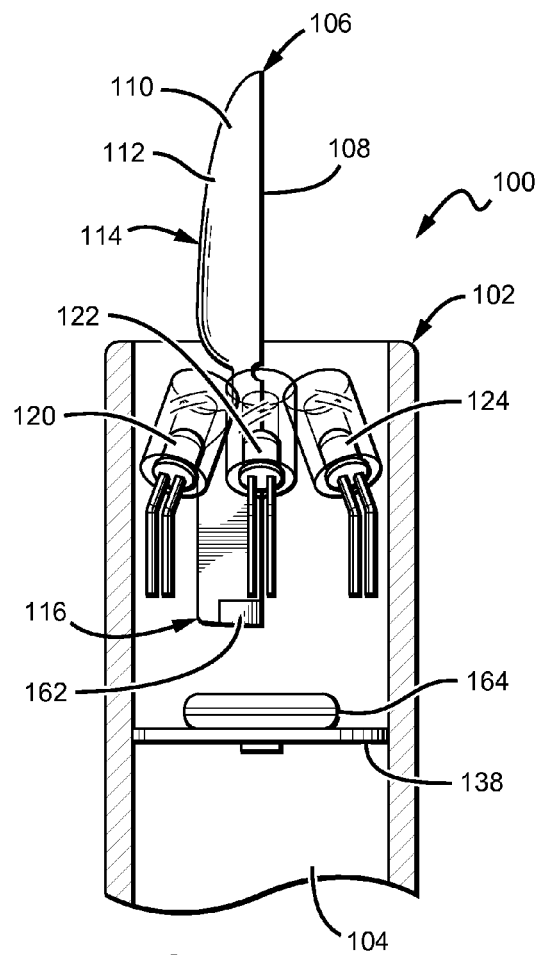
FIG. 1A
FIG. 1B
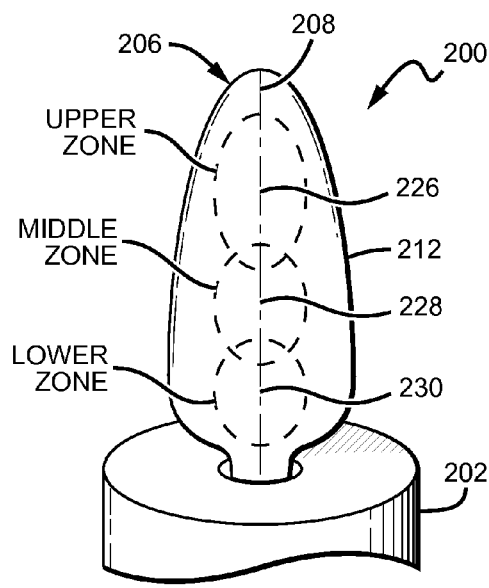
FIG. 2B
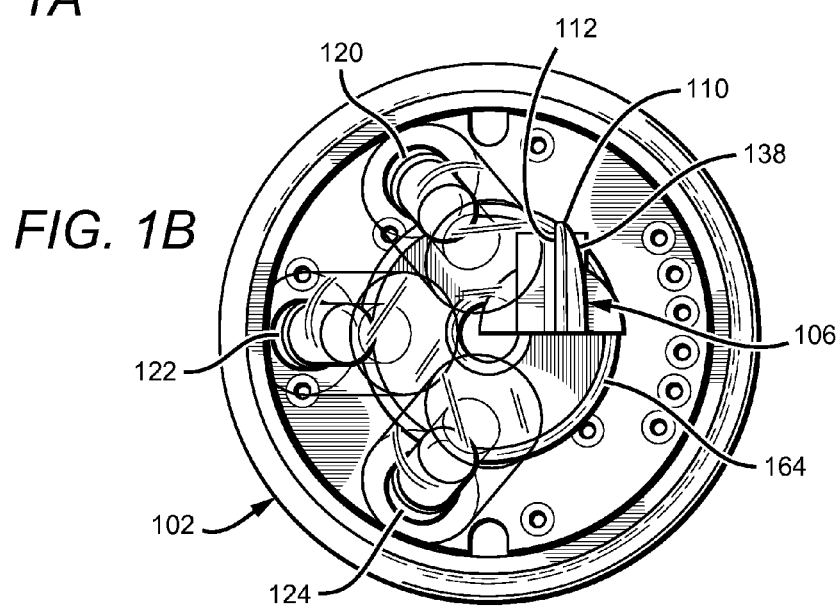

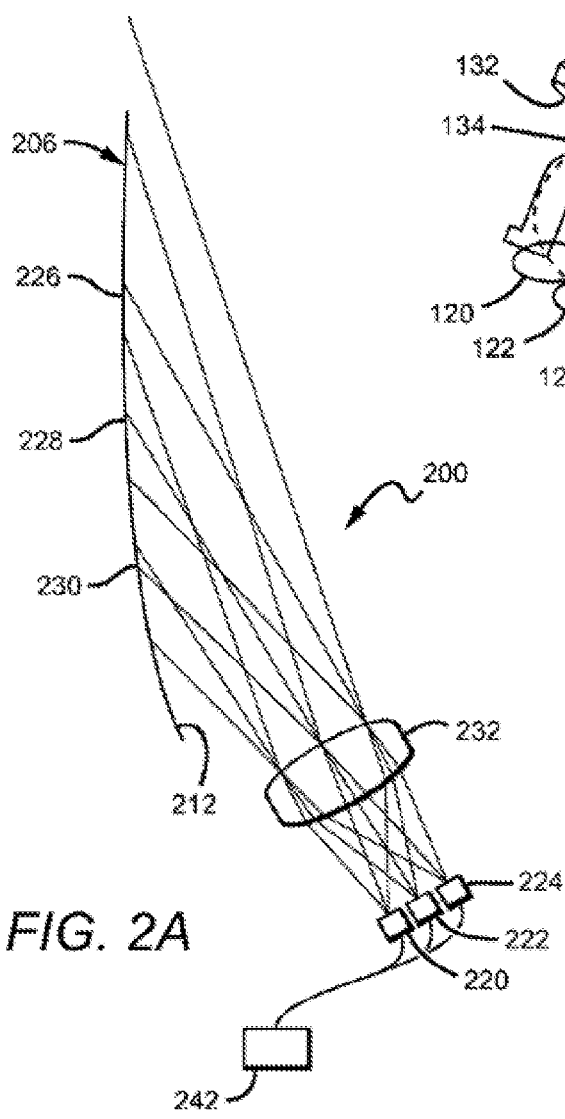
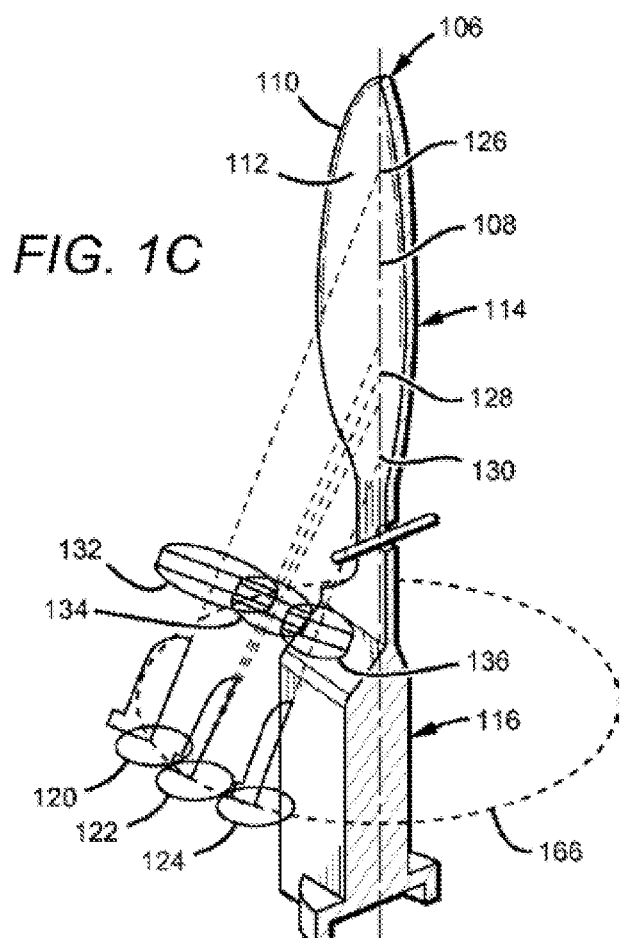
FIG. 1C
FIG. 2A

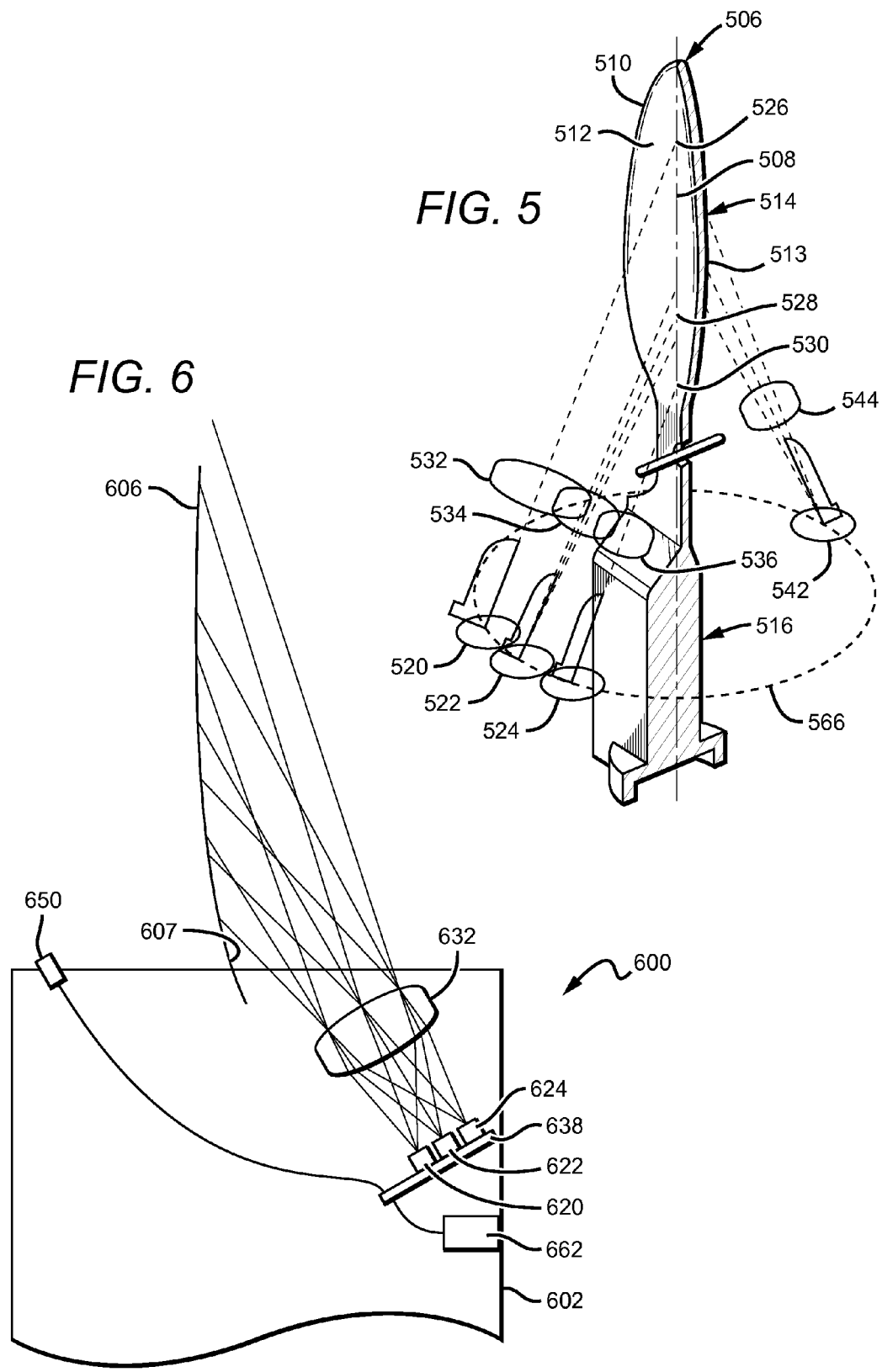

FIG. 8B
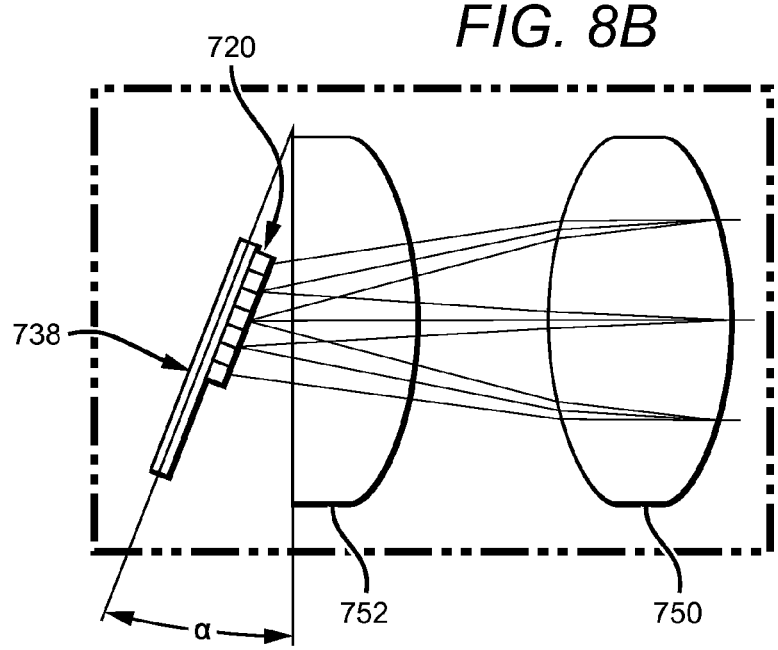
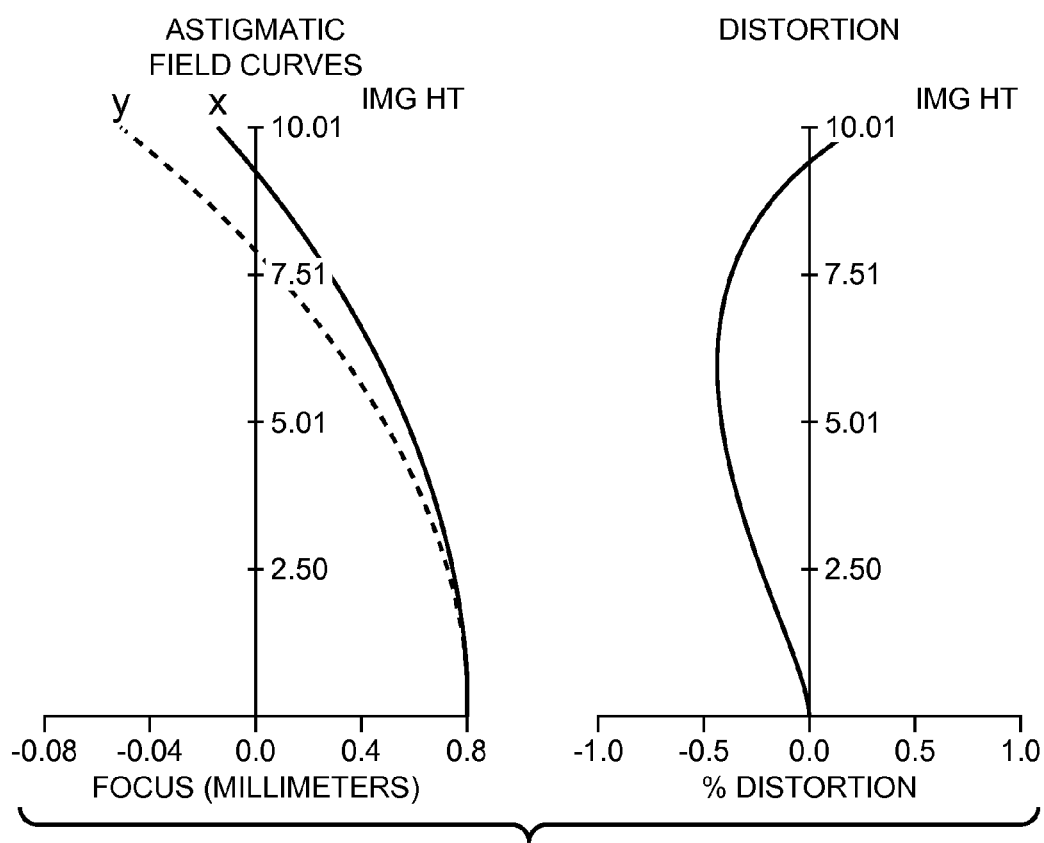
FIG. 10

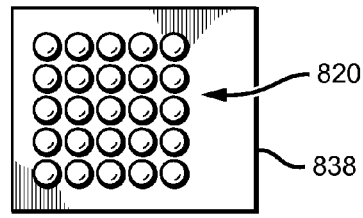
Array of RGB LEDs 5x5
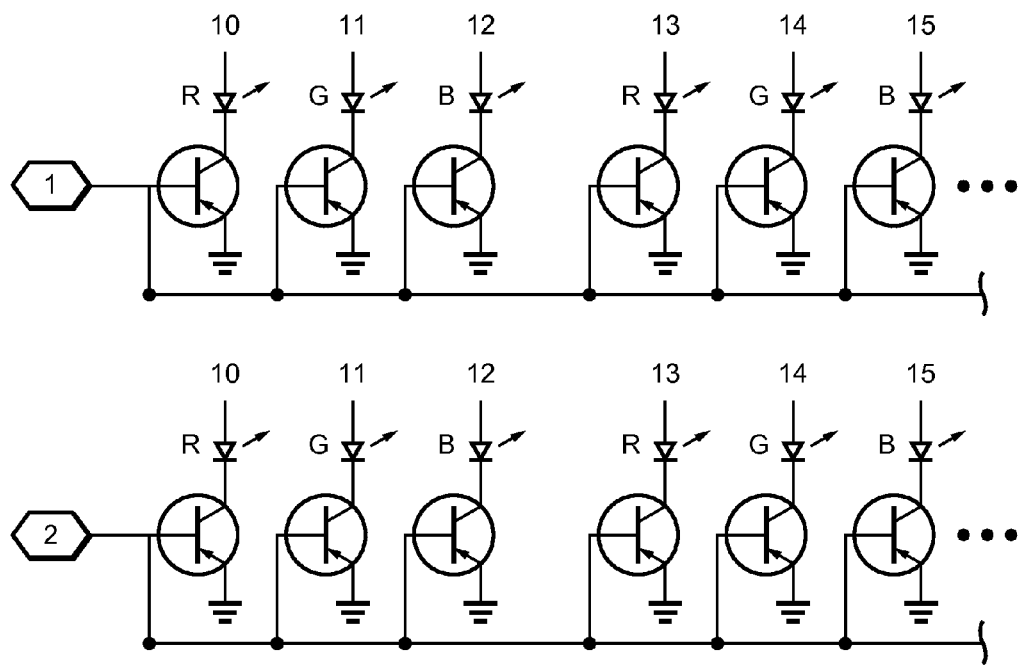
Sample connections for two RGB LEDs on two rows
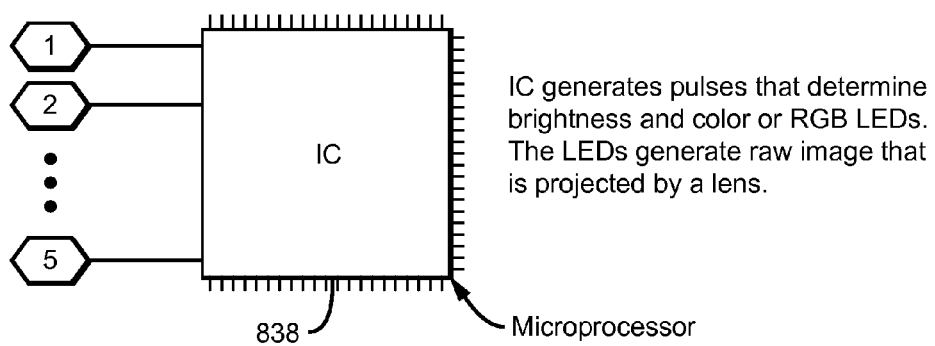
IC generates pulses that determine brightness and color or RGB LEDs. The LEDs generate raw image that is projected by a lens.
FIG. 9

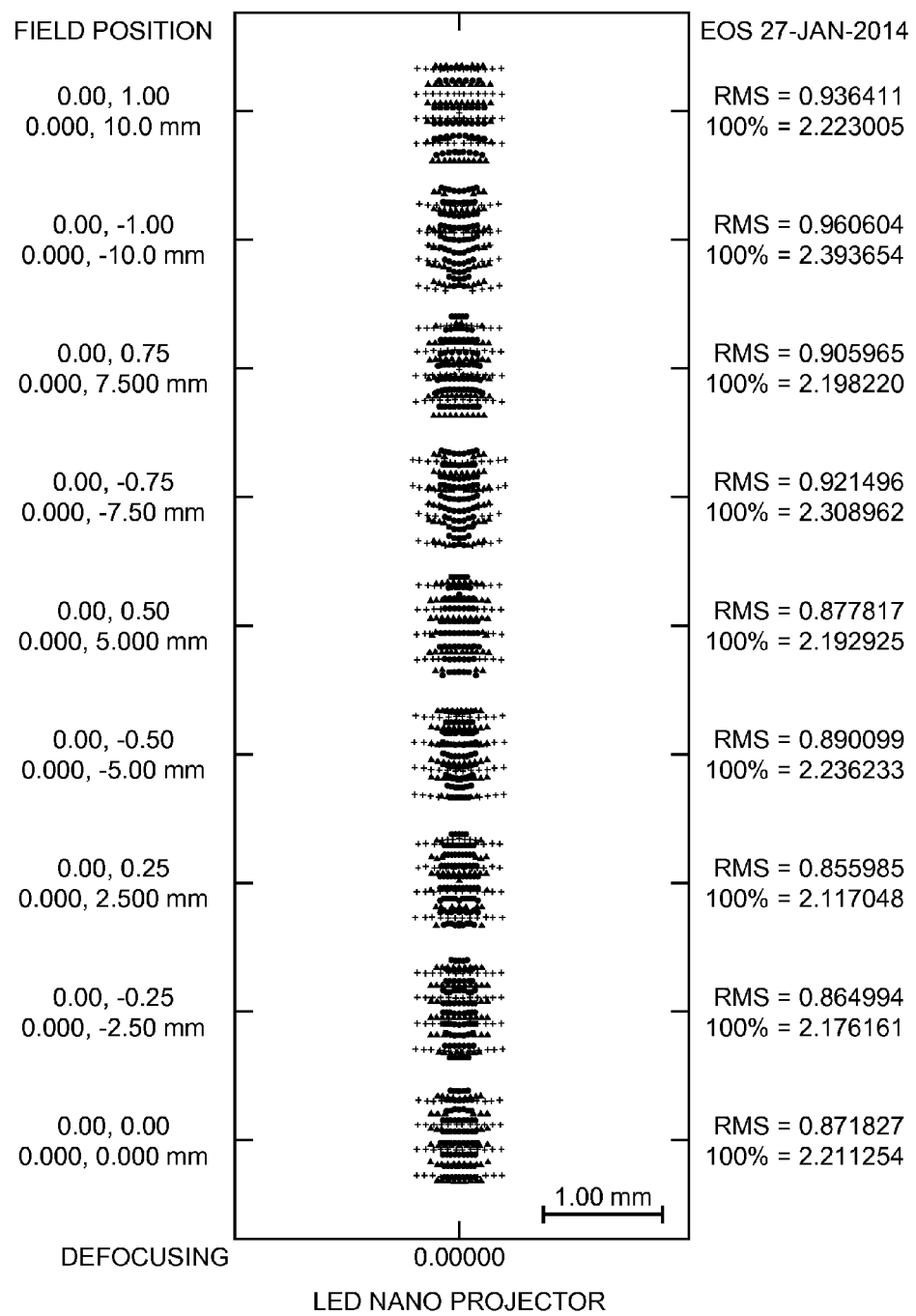

ELECTRIC LIGHTING DEVICES HAVING MULTIPLE LIGHT SOURCES TO SIMULATE A FLAME

This application claims the benefit of priority to U.S. provisional application having Ser. No. 61/758,602 filed on Jan. 30, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric lighting devices, and especially lighting devices configured to simulate a flickering flame.

BACKGROUND

The following background discussion includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., U.S. pat. publ. no. 2011/0127914 to Patton et al., U.S. Pat. No. 7,350,720 to Jaworski et al.; U.S. Pat. No. 7,686,471 to Reichow; U.S. pat. publ. no. 2005/0285538 to Jaworski et al. (publ. December 2005); U.S. Pat. No. 7,481,571 to Bistritzky et al.; U.S. pat. publ. no. 2008/0031784 to Bistritzky et al. (publ. February 2008); U.S. pat. publ. no. 2006/0125420 to Boone et al. (publ. June 2006); U.S. pat. publ. no. 2007/0127249 to Medley et al. (publ. June 2007); U.S. pat. publ. no. 2008/0150453 to Medley et al. (publ. June 2008); U.S. pat. publ. no. 2005/0169666 to Porchia, et al. (publ. August 2005); U.S. Pat. No. 7,503,668 to Porchia, et al.; U.S. Pat. No. 7,824,627 to Michaels, et al.; U.S. pat. publ. no. 2006/0039835 to Nottingham et al. (publ. February 2006); U.S. pat. publ. no. 2008/0038156 to Jaramillo (publ. February 2008); U.S. pat. publ. no. 2001/0033488 to Chliwnyj; U.S. pat. publ. no. 2008/0130266 to DeWitt et al. (publ. June 2008); U.S. pat. publ. no. 2012/0024837 to Thompson (publ. February 2012); U.S. pat. publ. no. 2011/0134628 to Pestl et al. (publ. June 2011); U.S. pat. publ. no. 2011/0027124 to Albee et al. (publ. February 2011); U.S. pat. publ. no. 2012/0020052 to McCavit et al. (publ. January 2012); U.S. pat. publ. no. 2012/0093491 to Browder et al. (publ. April 2012); and European publ. no. 1878449. However, while various mechanisms have been used to more closely simulate a flickering flame of a candle, such mechanisms suffer from one or more disadvantages.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved electric candles and other light sources that more realistically imitate a flickering flame.

SUMMARY OF THE INVENTION

The inventive subject matter provides apparatus, systems and methods in which one can simulate a flickering flame in an electric lighting device, such as a candle or light bulb. Preferred devices include a projection screen coupled to a housing such that some or all of the projection screen extends from the housing. Light can be projected onto an outer surface of the projection screen using one or more, and preferably at least two light sources. It is preferred that the device can include three or more light sources that collectively emit light on to a surface of the projection screen. In especially preferred embodiments, the device can include a LED matrix that can be used to project an image on to the projection screen.

In some contemplated embodiments, each of the light sources can emit light at a predominant wavelength that is different from the other light sources. As just one example, a first light source could emit a "blue" light, a second light source could emit a "white" light, and a third light source could emit an "orange" light. Of course, where more than three light sources are used, some may emit the same color of light. When discussing the color of light emitted by a light source, it is assumed that the color is the color visible to a viewer of the device based on the predominant wavelength of the light emitted by the light source. For example, a light source emitting "blue" light may emit light that resides predominantly in the "blue" portion of the color spectrum (e.g., a wavelength of between 450 nm-495 nm).

It is also contemplated that the projection screen has a central axis that bisects the projection screen vertically. In such embodiments, it is preferred that a focal point of each of the light sources lies along the central axis of the projection screen at rest.

Contemplated devices could further include one or more lenses that interact and preferably focus light emitted from the one or more light sources onto the projection screen's outer surface. In some embodiments, the device can have one or more lenses for each of the light sources, where each lens is disposed such that the lens focuses the light from the light source on to the projection screen or other projection surface.

It is alternatively contemplated that a shared lens could be used in place of the separate lenses for each light source. The shared lens could be manufactured such that it focuses light emitted from each of the light sources onto the projection screen. In some embodiments, it is contemplated that the lens could have different focal properties along its length to advantageously allow the lens to focus light from the light sources at various portions of the projection screen. The lens is preferably injection molded, although it could be formed by any commercially suitable process.

It is further contemplated that a set of shared lenses could be used for the light sources. For example, the light sources could collectively emit light through first and second lenses, where the second lens is disposed to receive some or all of the light emitted from the first lens. In some embodiments, the distance between the shared lenses can be varied such as by moving one or both of the lenses. This can advantageously change the focus of the lenses dynamically as the device operates. Movement of a lens could, for example, be correlated to the waveform associated with the lights and/or drive mechanism.

Alternatively or additionally, the device can include one or more sets of RGB light sources that advantageously allow a wide range of colors (e.g., 256 colors) to be emitted on to the projection screen. Even more advantageously, the RGB light sources can be used in conjunction with a microprocessor to project an image onto the projection screen. It is especially contemplated that an image of a flame could be projected. Preferably, the image has a low resolution to reduce the cost and power requirements of the projection system.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a vertical cross-section view of one embodiment of an electric lighting device.

FIG. 1B is a top view of the electric lighting device of FIG. 1A.

FIG. 1C is a perspective view of a schematic of the electric lighting device of FIG. 1A.

FIG. 2A is a schematic of another embodiment of an electric lighting device.

FIG. 2B is a front view of the electric lighting device of FIG. 2A.

FIG. 5 is a perspective view of a schematic of another embodiment of an electric lighting device.

FIG. 6 is a vertical cross-section view of yet another embodiment of an electric lighting device.

FIG. 8B is an enlarged view of a portion of FIG. 8A.

FIG. 9 illustrates one embodiment of a matrix of LEDs for use in the projection system of FIGS. 8A-8B.

FIG. 10 illustrates charts showing the astigmatic field curves and distortion of a projected image using the projection system of FIGS. 8A-8B.

FIG. 13 illustrates spot diagrams of the defocused image projected using the projection system of FIG. 12.

DETAILED DESCRIPTION

Figure 3B:
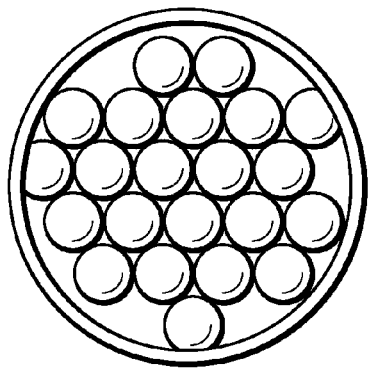
FIG. 3B is a top view of a RGB light source.

It should be noted that while portions of the following description is drawn to a computer/server based lighting control system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1A-1C illustrates one embodiment of an electric lighting device 100 that simulates a flickering flame having a housing 102. Preferred devices 100 include a projection screen 106 that may have a tear-drop or other shape to simulate the look of a flame. FIG. 1A shows a cutout of a projection screen having a tear-drop shape with a concavity. Although the projection screen 106 can be static with respect to the housing 102, it is preferred that the projection screen 106 be coupled to the housing 102 such that the projection screen can be moved using an electromagnet, a fan, or other drive mechanism(s). As shown best in FIG. 1C, the projection screen 106 can include (i) a face 112 and (ii) a back that faces away from the face 112, and may have one or more concavities.

The specific construction and/or materials comprising the projection screen can vary, and is further discussed below. For example, the screen could be opaque, translucent, or transparent, or combinations thereof. In addition, the projection screen could have multiple layers and/or multiple materials composing the projection screen. In some embodiments, the projection screen could be co-injection molded or insert injection molded to create a projection screen comprising different materials and/or different transparencies. For example, the projection screen could have an outer edge that has a greater transparency than a middle portion of the projection screen. It is also contemplated that the projection screen can have multiple faces, such as three or more faces, and/or could comprise various shapes including a cone, a sphere, or an inverted tear drop, for example.

At least a portion of the projection screen 106 extends from the housing 102, and in some embodiments, an upper portion 114 can extend from the housing 102 while a lower portion 116 can be disposed within the housing 102. However, where the projection screen is static, it is contemplated that all or substantially all of the projection screen 106 will extend from the housing 102.

Projection screen 106 has a central axis or hypothetic center line 108 that vertically bisects left and right portions of the projection screen 106. The projection screen 106 is preferably symmetric about its center line 108.

Preferred devices include one or more light sources, or sets of light sources, each of which is configured to emit light on to the face 112 of the projection screen 106, and preferably on to an outer surface 110 of the screen 106. As shown in FIGS. 1A-1C, device 100 includes first, second, and third light sources 120, 122, and 124, respectively, disposed within the housing 102 and outside and apart from the projection screen 106. Of course, the light sources could be disposed outside of the housing 102 without departing from the scope of the inventive subject matter discussed herein. Rather, than three individual light sources 120, 122, 124, it is alternatively contemplated that one or more of the light sources 120, 122, 124 could comprise a set of micro-LEDs or other lights. Thus, for example, instead of a traditional LED that may have a diameter of 1 mm, 6-8 micro-LEDs or more could be used in the same space. In such embodiments, it is especially preferred that the lights comprise RGB lights such that a variety of colors of light could be produced. It is also contemplated that the light sources 120, 122, 124 could collectively comprise a RGB light, and could be used in conjunction with additional RGB lights or other light sources.

Each of the light sources 120, 122, 124 is disposed within the housing 102 such that the focal points 126, 128, and 130 of each of the first, second, and third light sources 120, 122, and 124, respectively, lie along the center line 108 of the outer surface 110 of the projection screen 106 at rest. This is critical to generate a more realistic flame, especially where the projection screen 106 varies its position over time with respect to the housing 102. Preferably, the light sources 120, 122, 124 are also disposed adjacent to at least one other light source and near a center line 108 of the projection screen 106. By placing the light sources 120, 122, 124 near the screen's center line 108, the required brightness level of the light sources can be reduced, thereby reducing the energy requirements of device 100. It is further contemplated that the light sources 120, 122, and 124 could be disposed along the same horizontal plane 166, although in other contemplated embodiments, they could be vertically stacked, for example.

It is especially preferred that each of the light sources 120, 122, and 124 emits light at a predominant wavelength that is different from the other light sources. Thus, for example, the first light source 120 could emit visible light in the orange spectrum (e.g., a predominant wavelength of between 590 nm-620 nm), the second light source 122 could emit white light, and the third light source 124 could emit visible light in the blue spectrum (e.g., a predominant wavelength of between 450 nm-495 nm).

In some contemplated embodiments shown in FIGS. 1A-1B, the light sources 120, 122, and 124 can each be disposed at an angle with respect to the projection screen 106 that is different from the other light sources. This enables light emitted from the light sources 120, 122, and 124 to be directed at different portions of the projection screen 106. As shown in FIG. 1C, light emitted from the first light source 120 can be directed predominantly at an upper portion of the outer surface 110 of the projection screen 106, light emitted from the second light source 122 can be directed predominantly at a middle portion of the outer surface 110 of the projection screen 106 below the upper portion, and light emitted from the third light source 124 can be directed predominantly at a lower portion of the outer surface 110 of the projection screen 106 below the middle portion. An exemplary diagram of the overlapping focal zones with a border around the zones to prevent or reduce bleed over is shown in FIG. 2B.

In this manner, the visible lighting effect on the projection screen 106 can include an orange color around a periphery of the projection screen 106 with a blue color at its bottom. By ensuring the light sources 120, 122, 124 are each focused on a center line 108 of the projection screen 106 at rest, while also disposing the light sources 120, 122, 124 near the center line 108 of the projection screen at rest 106, light from each of the light sources 120, 122, 124 can be highly focused on specific portions of the projection screen 106 while reducing the power requirements of the LEDs or other lights to generate the necessary lighting effect. This also helps reduce bleed over of light in embodiments where the projection screen 106 moves with respect to the housing 102.

As shown in FIG. 1C, each of the light sources 120, 122, 124 can include or otherwise interact with a distinct lenses 132, 134, 136, respectively, which is disposed to intercept light emitted from the light source and focus the light on to the projection screen 106. For example, light emitted by the first light source 120 can interact with a first lens 132, light emitted by the second light source 122 can interact with a second lens 134, and light emitted by the third light source 124 can interact with a third lens 136. The lenses 132, 134, 136 advantageously allow light from the light sources to be focused along different points of the center line 108 of the projection screen 106, and thereby create different focal areas of light. Alternatively, as discussed in further detail below, a single lens could be used in conjunction with the light sources 120, 122, and 124.

In preferred embodiments, each of lenses 132, 134 and 136 is biconvex, although the specific type of lens may vary depending on the application.

Each of the lenses 132, 134 and 136 is preferably produced via injection molding.

FIGS. 2A-2B illustrate another embodiment of an electric lighting device 200 having multiple light sources 220, 222, 224 that are each focused onto a projection screen 206 using a shared lens 232. Device 200 comprises a housing 202 within which light sources 220, 222, and 224 are disposed. Light emitted from the light sources 220, 222, and 224 can pass through a single lens 232 and advantageously be directed at specific, but overlapping portions of the projection screen 206 as shown in FIG. 2B. For example, light emitted from light source 220 has a focal point 226 in an upper portion of the projection screen 206, light emitted from light source 222 has a focal point 228 in a middle portion of the projection screen 206 below the upper portion, and light emitted from light source 224 has a focal point 230 in a lower portion of the projection screen 206 below the upper and middle portions. Preferably, each of the focal points lies along a center axis or line 208 of the projection screen 206.

Where a shared lens 232 is used, it is preferred that the lens 232 have different focal properties (e.g., focal lengths) across a width of the lens 232 to thereby allow the lens 232 to focus light entering at different points on to different areas of the projection screen 206. Preferred lenses are co-injection molded or insert injection molded, which allows the lens to have different focal properties at specific points of the lens. It is also preferred that the lens is biconvex, although other types of lenses could be used depending on the specific application.

Figure 7:
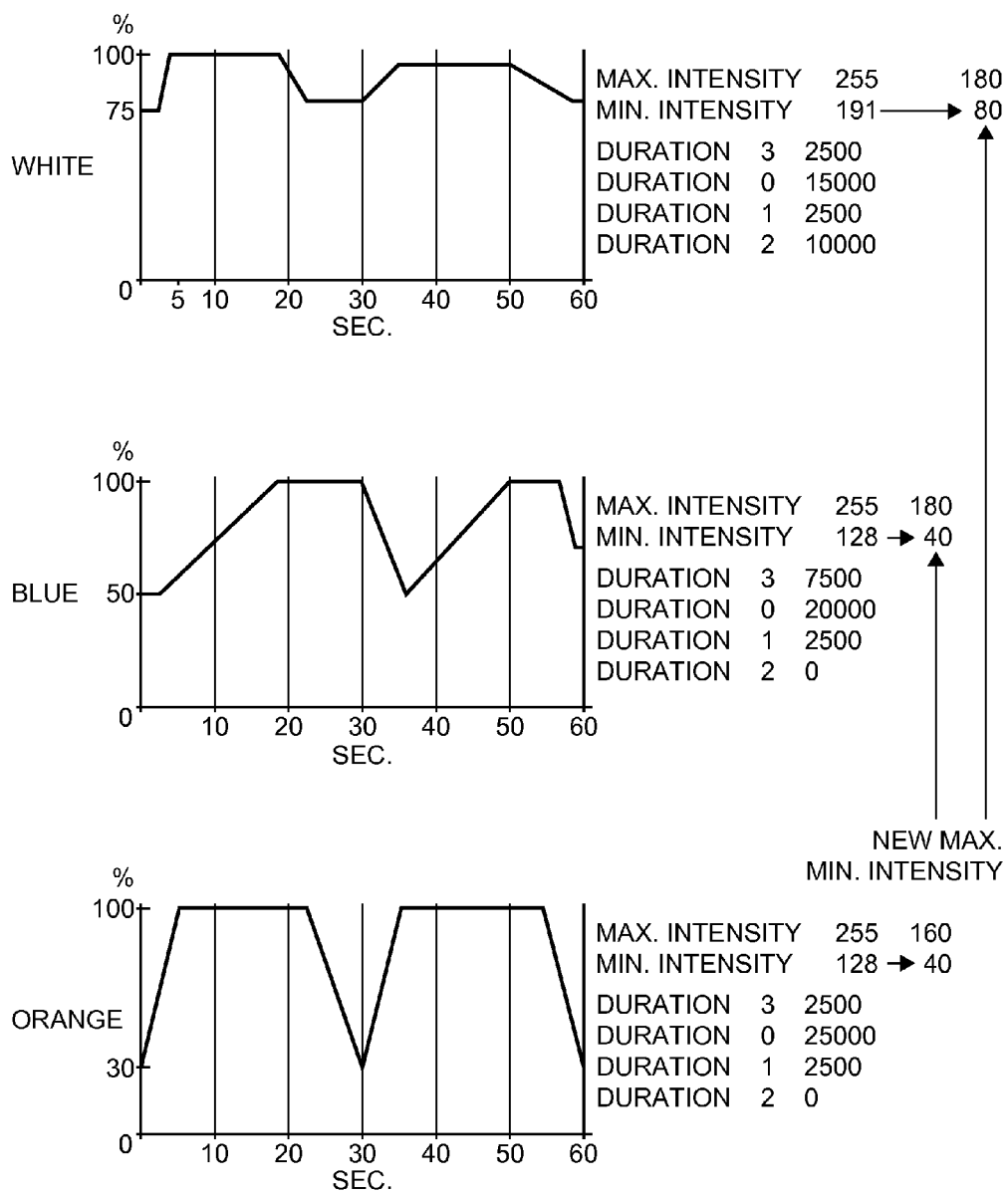
FIG. 7 is a chart showing different waveforms that could be used to vary the intensity of different colors of light emitted over time.

Device 200 can further include a light controller 242 that is adapted to modify parameters of the light sources 220, 222, and 224 over time. Such parameters could include, for example, a brightness of the light emitted by the light source, an on/off status of that light source, a position of a light source, a focal point of a light source, an angle of a light source with respect to the projection screen, a color of light emitted by the light source, and so forth. Preferably, such modifications occur as a function of one or more waveforms. It is especially preferred that each of the light sources 220, 222, and 224 could have its own unique waveform that governs the behavior of the light source. An exemplary diagram of waveforms of the light sources 220, 222, and 224 is shown in FIG. 7. Thus, while each of the light sources 220, 222, and 224 can be individually controlled, it is contemplated that the control can account for parameters of neighboring light sources and/or the movement or current position of the projection screen where the projection screen is non-stationary.

As discussed above, the light controller 242 can be used to vary a brightness of one or more of the light sources 220, 222, and 224 over time, and preferably as a function of one or more waveforms. It is especially preferred that each of the light sources 220, 222, 224 emit light according to its own unique waveform that is distinct from, but congruent with, the waveforms of the other light sources. Thus, for example, a brightness of the first light source 220 can be varied according to a first waveform that accounts for the relative brightness of light sources 222 and 224 at each point in time. This allows the device 200 to produce a more realistic effect simulating a flickering flame, and ensures that the respective levels of light emitted from each light source 220, 222, 224 produces a realistic effect as the various lights may dim, change colors, and so forth. The light sources can thereby be dimmed in unison, or different colors of light could be accented at various times to reflect the ever-changing nature of a burning flame.

In addition to varying their brightness, one or more of the light sources 220, 222, 224 could be cycled on and off over time.

It is also contemplated that a position of one or more of the light sources 220, 222, 224 could be varied over time according to predefined waveform or program. This could include for example, translating a position of the light source and tilting an angle of the light source with respect to the projection screen 206 to cause light to be emitted at different regions of the projection screen 206 and/or to accommodate for movement of the projection screen 206. In just one example, a light source emitting "blue" light could be tilted upwardly and downwardly over time to simulate a dancing effect of a flame that jumps up every so often. In addition, or alternatively, one or more filters or screens could be used to restrict the area where light is emitted on the projection screen 206.

As shown in FIG. 2B, the projection screen 206 could be fixed in position, at least temporarily, with respect to the housing 202. However, it is further contemplated that the projection screen 206 could be coupled to the housing 202 to allow for movement of the projection screen 206 with respect to the housing 202.

The light sources 220, 222, and 224 could be stacked vertically as shown in FIG. 2A. However, they could also be stacked horizontally, preferably along a horizontal plane as discussed above.

Figure 3A:
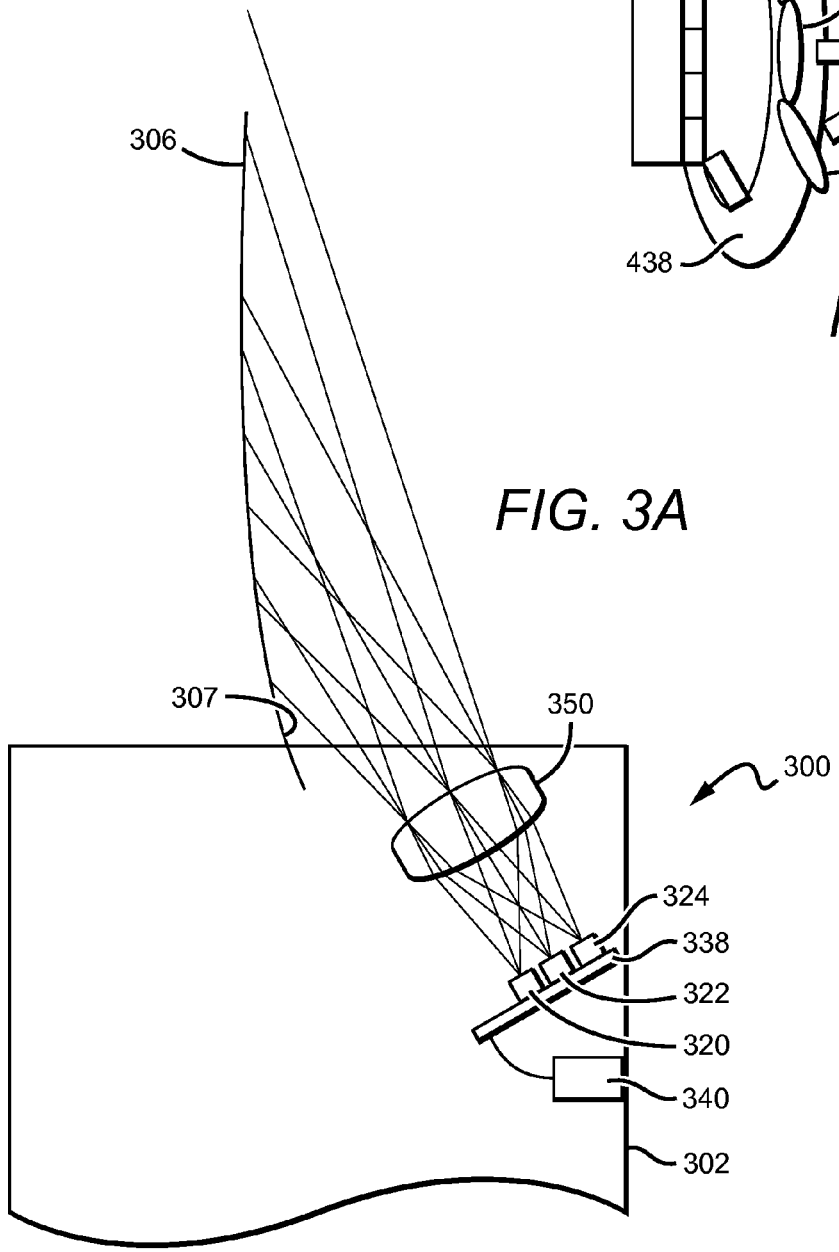
FIG. 3A is a vertical cross-section view of another embodiment of an electric lighting device.

FIG. 3A illustrates another embodiment of an electric lighting device 300 that utilizes light sources 320, 322, and 324 to emit light onto the projection screen 306. The light sources 320, 322, 324 preferably comprise a RGB light source, which advantageously allows for various colors of light to be focused onto different portions of the projection screen 306 from the housing 302. In an alternative embodiment, the light sources could emit the same color of light, or emit different colors, such as blue, orange and white as described above.

Each of the first, second, and third light sources 320, 322, and 324 are advantageously affixed to a circuit board 338, eliminating the need to separately wire the leads of the light sources 320, 322, and 324 to the board 338. In such embodiments, it is preferred that each light source 320, 322, 324 comprises a micro-LED having a width of no more than 250 nm, and more preferably no more than 200 nm. The micro-LEDs could be minimally spaced apart (e.g., less than 50 mm).

As shown in FIG. 3B, it is contemplated that each light source could include a plurality of micro-LEDs, and more preferably, between 8-24 micro-LEDs. For the light source shown, it is contemplated that the light source could have a diameter of less than 3 mm.

Light from the light sources can be collected by lens 350 and focused on to the projection screen 306. As shown in FIG. 3A, light from light source 320 can be focused on to an upper portion of the projection screen, light from light source 322 can be focused on to a middle portion of the projection screen 306, and light from light source 324 can be focused on to a lower portion of the projection screen 306. Preferably, because of the curved shape of the projection screen 306, the light sources 320, 322, and 324 are angled to account for this according to the Scheimpflug principle.

Device 300 can further include an image processor 340 configured to coordinate the color and brightness of the light sources 320, 322, and 324. This could be accomplished via one or more lighting programs that are either locally stored or remotely received by the device 300. For example, circuit board 338 could include a memory for local storage and/or a wireless network card configured to receive information via a network. Alternatively, circuit board 338 could be coupled to memory. Although shown separate from board 338, processor 340 is preferably mounted on board 338. With respect to the remaining numerals in each of FIGS. 3A-3B, the same considerations for like components with like numerals of FIGS. 1A-1C apply.

Figure 4:
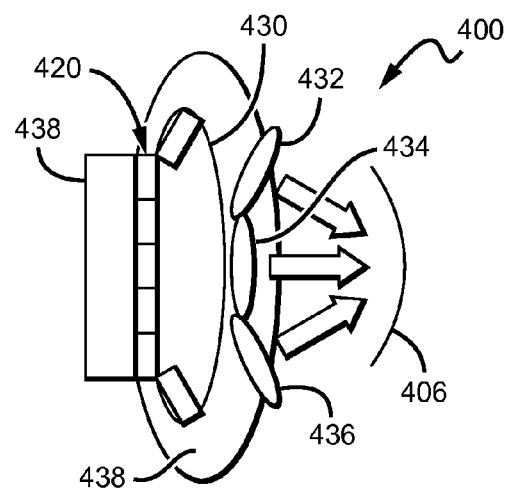
FIG. 4 is a horizontal cross-section view of one embodiment of a light source and lens combination.

FIG. 4 illustrates a horizontal cross-section of an embodiment of a smart LED system 400, in which RGB light sources 420 are affixed on a circuit board 438. A field lens 430 can be used to collect light emitted by the various light sources 420 and direct the light to lenses 432, 434, and 436, where it will be focused onto different portions of a projection screen 406. The field lens 430 and lenses 432, 434, and 436 can comprise a single lens 432, preferably through co-injection or insert injection molding. The lens 432 preferably includes different focal properties across its width, and has regions (i.e., lenses 432, 434, and 436) that focus light in specific directions and have specific focal lengths. For example, a first region could direct light in a downward direction, a second region could direct light at a middle portion of the projection screen 406, and a third region can direct light at an upper portion of the projection screen 406.

FIG. 5 illustrates another embodiment of an electric lighting device 500 having a fourth light source 542 disposed to emit light predominantly on to a back 513 of the projection screen 506 opposite the face 512, and along the center line 508 of the projection screen 506 at rest. The addition of a light source 542 emitting light on an opposite side of the projection screen can allow for backlight and assist in creating additional effects, especially where at least a portion of the projection screen 506 is translucent or transparent.

Although the light is shown projecting on to a middle portion of the projection screen 506, light could instead or additionally be directed at the upper and/or lower portions of the projection screen 506. In addition, one or more filters could be used to affect the light being emitted on to the projection screen 506. For example, a screen could be used that restricts light to only be projected onto a perimeter of the projection screen at rest.

FIG. 6 illustrates yet another embodiment of an electric lighting device 600 having a sensor 650 that is configured to detect a movement of the projection screen 606 with respect to the sensor 650. Such movement could include an angular position of the projection screen 606 with respect to the housing 602, or vertical and/or horizontal angulations of the projection screen 606 with respect to the housing 602. The sensor 650 can then relay a sensor signal to a light controller 662 or other component of the device 600, which can use the information provided in the signal to vary one or more parameters of some or all of the light sources 620, 622, 624. For example, the controller 662 may reduce the brightness of or turn off one or more of the light sources or a portion thereof depending on the present angle or location of the projection screen 606.

Alternatively or additionally, the sensor 650 or a second sensor could be used to detect a level of ambient light. In this manner, the brightness or other parameters of some or all of the light sources 620, 622, 624 could be varied as a function of the level of ambient light detected. For example, the brightness of the light sources could be dimmed as the level of ambient light decreases. However, in alternative embodiments, it is contemplated that the level of ambient light could be increased when ambient light decreases to provide a user with additional light when needed.

Although three light sources are shown, it is contemplated that device 600 can include one or more light sources. Moreover, each of the light sources could comprise a set of micro-LEDs as described above. In addition, it is contemplated that a single lens could be used with all of the light sources, or each light source could have a separate lens that focuses light from the light source.

FIG. 7 illustrates one embodiment of waveforms for a tri-LED device. The first waveform illustrates an intensity of white light over a 60 second period. The second waveform illustrates an intensity of blue light over the same 60 second period and the third waveform illustrates an intensity of orange light over the same 60 second period. As shown in the waveforms, at certain times, the intensities of the three colors of lights can be equal. Each of the waveforms can have periods of rising intensity, falling intensity, and constant intensity. In addition, there could be periods of no intensity depending on the specific application. Critically, the intensities of each color of light can be varied over time to more closely simulate the colors of a real flame as it changes in shape and moves over time.

Figure 8A:
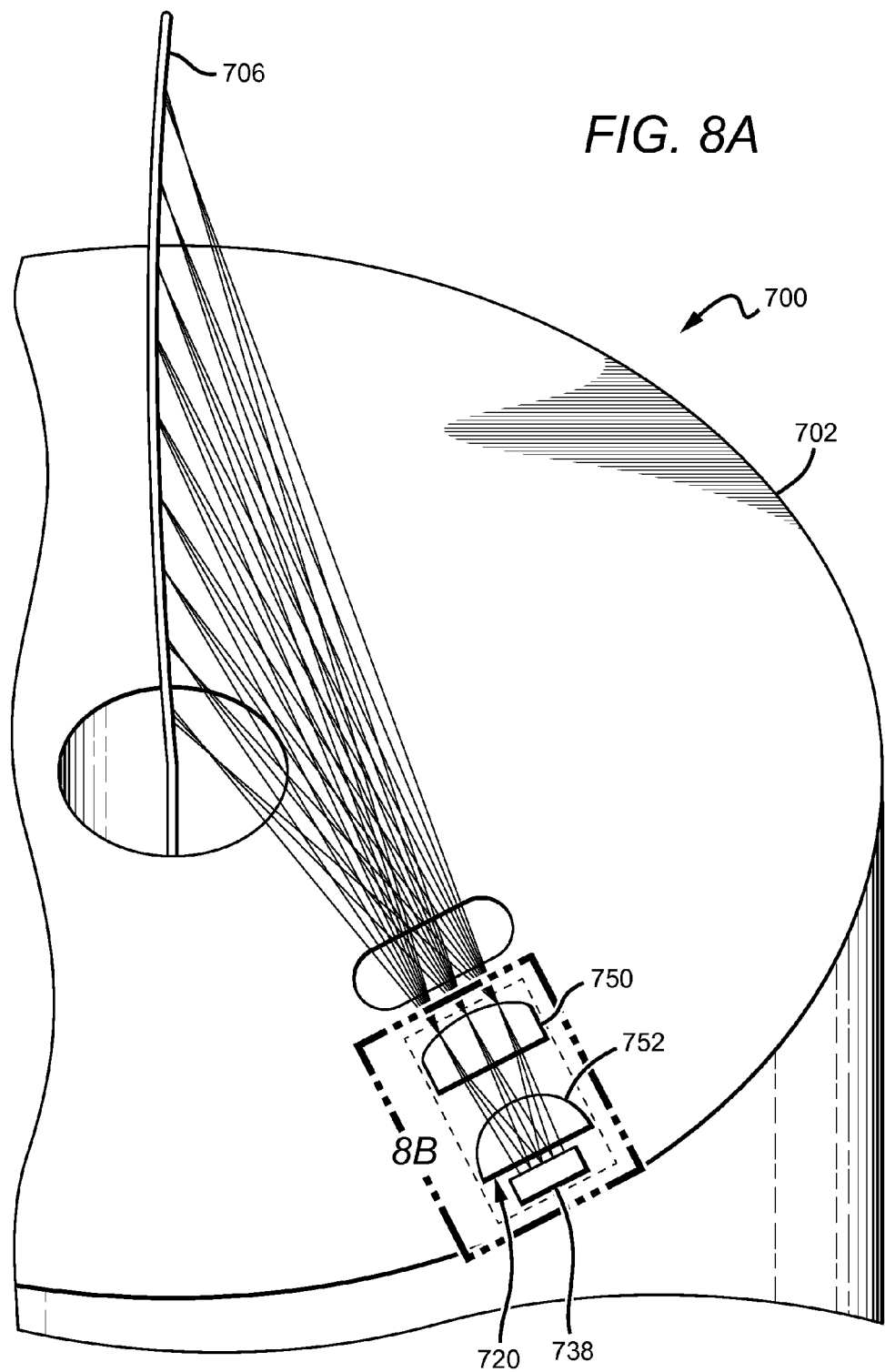
FIG. 8A is top, perspective view of another embodiment of an electric lighting device having a projection system.

In FIGS. 8A-8B, another embodiment of an electric lighting device 700 is shown having a low resolution projection system comprising circuit board 738, a plurality of light sources 720 and lenses 750 and 752. The projection system can be used to reimage a small illuminated image (such as a flame) or a set of images onto a larger, projection screen at a distance. FIG. 8B is an enlarged version of Box A of FIG. 8A. The projection system is further discussed below in conjunction with FIG. 9.

The electric lighting device 700 can include a housing 702 in which a plurality of light sources 720 can be disposed. The light sources 720 are preferably mounted to a circuit board 738, such that separate soldering of the leads of the light sources to the circuit board 738 is not required. This advantageously reduces complexity during manufacture and the possibility of separation of a lead from the board 738.

It is especially preferred that the light sources 720 comprise micro-LEDs, which advantageously allow for multiple light sources to be disposed in place of a traditional LED light. Each of the micro-LEDs could be chosen to emit a specific, predominant color of light, and preferably the micro-LEDs collectively comprise multiple sets of RGB (red/green/blue) lights. In such embodiments, it is contemplated that 6-8 micro-LEDs or more could be used in the place of a single, traditional LED. It is further contemplated that an array of LEDs could be used that collectively emit light on to the projection screen 706. Contemplated micro-LEDs have a width of no more than 250 nm, and more preferably no more than 200 nm. The micro-LEDs could be minimally spaced apart (e.g., less than 50 mm).

The plurality of lights 720 collectively emits light onto a projection screen 706. The device 700 can include a shared field lens 752 that collects the light emitted from the lights 720 and directs it preferably into a second, shared lens 750, which then focuses the light on to different portions of the surface of the projection screen 706. Although a scale of 6.67 mm is shown, the specific dimensions of the device and its components may vary depending on the application and the components used.

As shown in FIG. 8B, the lights 720 are tilted with respect to the lens 752 by an angle α to account for the projection screen 706 being at an acute angle (e.g., approx. 70 degrees) relative to the projection system. The specific angle α that the lights 720 should be tilted can be determined using the Scheimpflug principle. Preferred angles are between 10-15 degrees, and more preferably are approximately 11-13 degrees.

Lenses 750 and 752 are preferably both injection molded plastic elements, and could be molded using Zeonex™. Lens 752 is shaped like an immersion lens, although the display isn't actually in contact with the lens 752. Lens 752 can have a flat, planar surface facing the light sources 720 and an spherical surface opposite the flat surface that faces lens 750. In some contemplated embodiments, the spherical radius is approximately 1.8 mm and the lens 752 could have a diameter of approximately 3.0 mm. However, the precise dimensions of the lens 752 could vary depending on the number of lights 720, the distance between the lens 752 and second lens 750 and lights 720, and other factors.

As described above, lens 750 is used to focus the light collected by lens 772 on to the surface of the projection screen 706. Preferably, lens 750 is biconvex. In one embodiment, lens 750 can have a spherical surface of approximately 5.0 mm on the side facing lens 752, and an aspheric surface with a base radius of about 2.25 mm on the opposite side.

Figure 11:
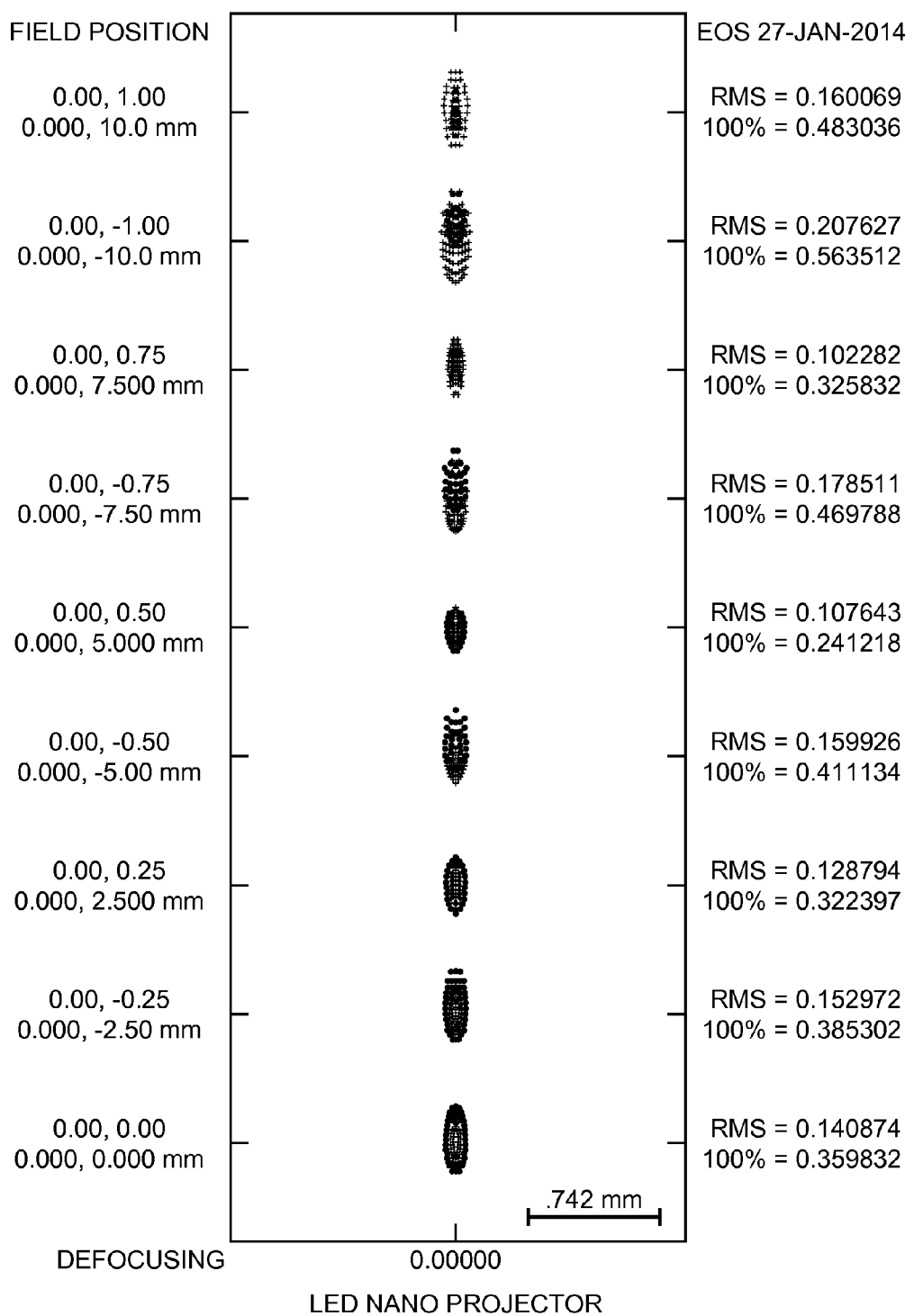
FIG. 11 illustrates spot diagrams of an image projected using the projection system of FIGS. 8A-8B.

Using the lights 720 and lenses 750 and 752, an image of a flame, for example, can be projected and reasonably reproduced in an elongated, magnified and inverted image on the projection screen 706, as shown in FIG. 11. Each of the spot images in FIG. 11 represents points in the display image from bottom to top, and vary in size at the projection screen 706 from approximately 0.127 mm-0.254 mm. The spots can also be defocused, as shown in FIG. 13 where the spot sizes are approximately 1.0 mm.

FIG. 9 illustrates one embodiment of a projection system that includes a 5×5 array of micro-LEDs 820 mounted to a circuit board having a microprocessor 838. This is an important distinction compared with traditional projectors that utilize a display having a single white background and illuminate colors in each sub pixel using polarized light. The projection systems contemplated herein instead use a pattern generating matrix of LEDs and use the actual light generated by the LEDs for projection. Rather than use video information to display images, the pattern generating matrix utilizes discrete pulses that generate a pattern of various intensity (that can simulate a video image).

The array preferably includes N number of rows (here, five) of RGB LEDs that comprise a red LED, a blue LED and a green LED in one set. The array has X number of columns of RGB LEDs. Depending upon the number of RGB LEDs, a microprocessor 838 with the required number of outputs is selected to perform control functions. For the 5×5 matrix shown, five row control outputs and fifteen LED control outputs are used, and require that microprocessor 838 has 20 or more outputs. The precise number of micro-LEDs could vary depending on the specific application and the size of the projection screen.

In one contemplated embodiment, the projection system can activate each row using a signal from the microprocessor 838 sequentially at a rapid rate so that flicker is not detected by the human eye. It is contemplated that only one row is activated at a time. When a row is activated, all of the RGB LEDs, each comprising a red LED, a green LED and a blue LED can be individually controlled by the microprocessor outputs. Using pulses of various duration and magnitude, the color and intensity of the RGB light output is determined, and this output is then projected onto the projection screen.

Where the projection screen is a non-normal surface, it is preferred that the LEDs or other light source are titled to account for the curved nature of the projection screen.

Figure 14:
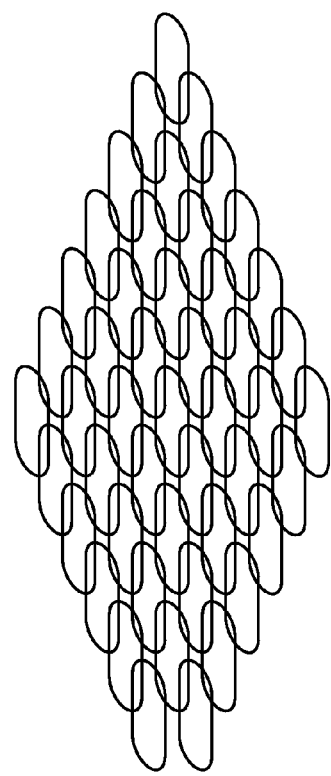
FIG. 14 illustrates an exemplary flame image as projected using the projection system of FIGS. 8A-8B.

A software algorithm can dissect or parse an image to be projected into a pixilated image and then project the pixilated image onto a projection screen by way of a plurality of overlapping focal zones, such as that shown in FIG. 14. By overlapping the focal zones, such as by defocusing the image, the pixels are blurred, which assists in producing the low resolution image. In this manner, an image can be defocused resulting in a low resolution image, which reduces the cost of the equipment needed to produce the effect.

FIG. 10 illustrates the astigmatic field curves and the distortion expected in an image projected by the light sources and lenses shown in FIGS. 8A-8B. The left chart illustrates the astigmatism resulting from the non-planar surface of the projection screen shown in FIG. 8A across the height of the image projected on the projection screen. The right chart illustrates the expected distortion percentage across the height of the image on the projection screen 706, which is less than about 0.50%.

Figure 12:
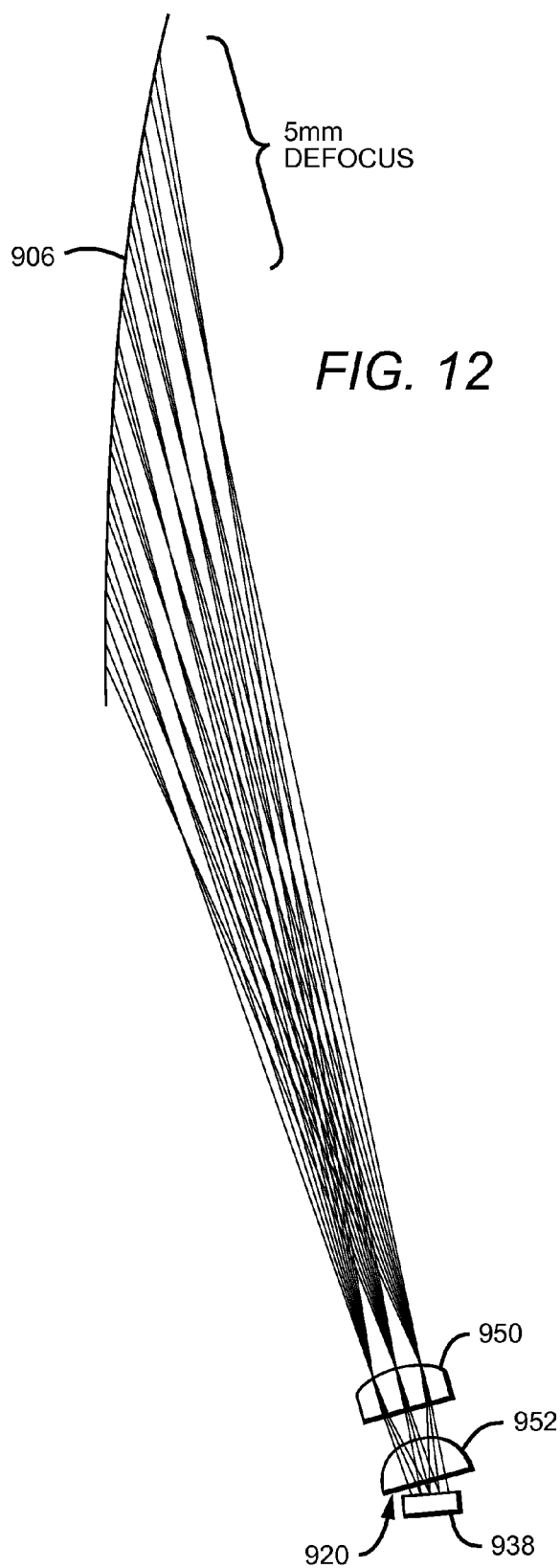
FIG. 12 illustrates another embodiment of an electric lighting device having a projection system that defocuses the projected image.

FIG. 12 illustrates another embodiment of an electric lighting device 900 similar to that shown in FIG. 8A, except that the projection is purposely defocused at the projection screen 936. With a 5.0 mm defocus, this results in an enlarged spot size of approximately 1.0 mm, as shown in FIG. 13. With respect to the remaining numerals in FIG. 12, the same considerations for like components with like numerals of FIG. 8A apply.

FIG. 14 illustrates how a flame image could be generated on a projection screen with a relatively small display pixel count. For example, the flame image shown has a pixel height of about 13 pixels and a width of about 7 pixels. In comparison, a LCD television is typically capable of about 18 pixels per millimeter. It is contemplated that the image may require an array of LEDs of approximately 2.5 mm-3.0 mm in width to produce the image shown, but with advancing technology, the width could likely be reduced to 1 mm or less. To produce a visible image with such a low resolution, it is important to defocus the image to blend the pixels into a smooth or semi-smooth image. In the image shown, the pixels are spaced approximately 0.150 mm apart at the array and approximately 1.0 mm apart on the projection screen, but have been overlapped by focus selection. Although the focal zones (pixels) are shown of similar size, it is contemplated that some of the focal zones could be of a different size.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric lighting device that simulates a flickering flame, comprising:
   a housing having an interior cavity;
   a projection screen coupled to the housing such that at least a portion of the projection screen extends from the housing, wherein the projection screen comprises a curved shape and a center line that bisects the projection screen vertically;
   a set of light sources disposed within the interior cavity at an angle with respect to the projection screen and first and second lenses according to the Scheimpflug principle to account for the curved shape of the projection screen, wherein the light sources are disposed with respect to the projection screen such that light from each of the light sources is emitted on to the projection screen;
   a light controller configured to vary one or more parameters of at least one of the first, second, and third light sources; and
   wherein the light sources collectively comprise an array of micro-LEDs mounted to a circuit board, and wherein the circuit board is tilted at a first angle with respect to a face of the first lens that is closest to the circuit board, such that the circuit board and the face are not parallel to one another, and wherein the micro-LEDs are configured to project an image comprising a plurality of overlapping focal zones that are defocused at the projection screen.

2. The device of claim 1, wherein each of the first and second lenses is injected molded.

3. The device of claim 1, wherein the light sources are apart from the projection screen.

4. The device of claim 1, wherein the projection screen is coupled to the housing so as to allow movement of the projection screen with respect to the housing.

5. The device of claim 4, further comprising a sensor coupled to the light controller, and wherein the sensor is configured to (i) detect movement of the projection screen with respect to the sensor and (ii) provide a first signal to the light controller to vary one or more parameter of at least one of the light sources.

6. The device of claim 5, wherein the sensor is further configured to (i) detect a level of ambient light and (ii) provide a second signal to the light controller to vary one or more parameter of at least one of the light sources.

7. The device of claim 1, wherein each of the light sources comprises a RGB light source.

8. The device of claim 1, wherein the light controller is configured such that one or more of the light sources operate according to a unique waveform.

9. The device of claim 1, wherein the light controller is configured to vary a collective brightness of some or all of the light sources according to one or more predefined waveforms.

10. The device of claim 1, wherein the light controller is configured to cycle one or more of the light sources on and off.

11. The device of claim 1, wherein the first angle is between 10-15 degrees.

12. The device of claim 1, wherein the first lens comprises a flat, planar surface facing the light sources and a spherical surface opposite the flat surface.

* * * * *